Nov. 4, 1952
W. F. GRATTAN
2,616,537
FLUID TRANSMISSION
Filed March 14, 1949
2 SHEETS—SHEET 1
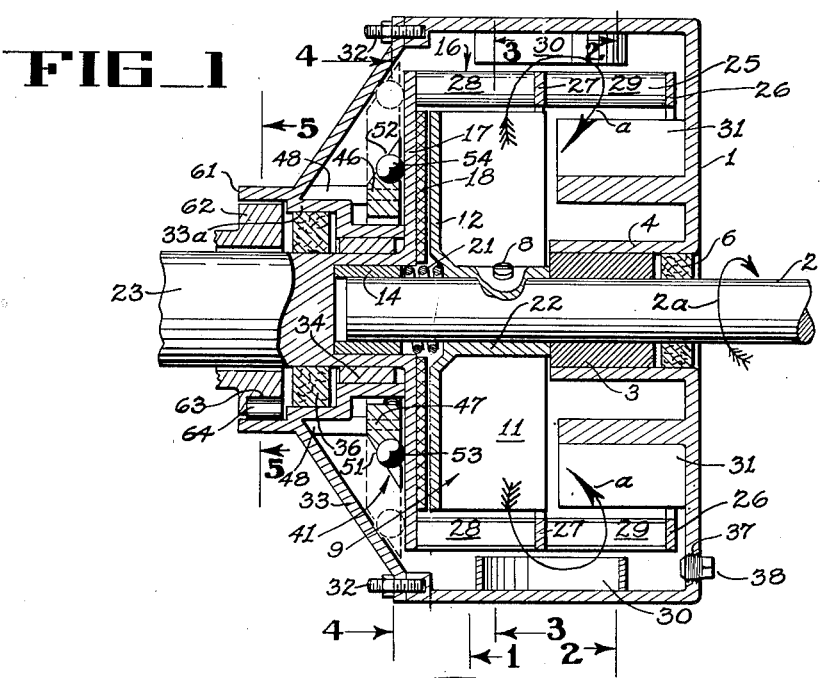
FIG_1
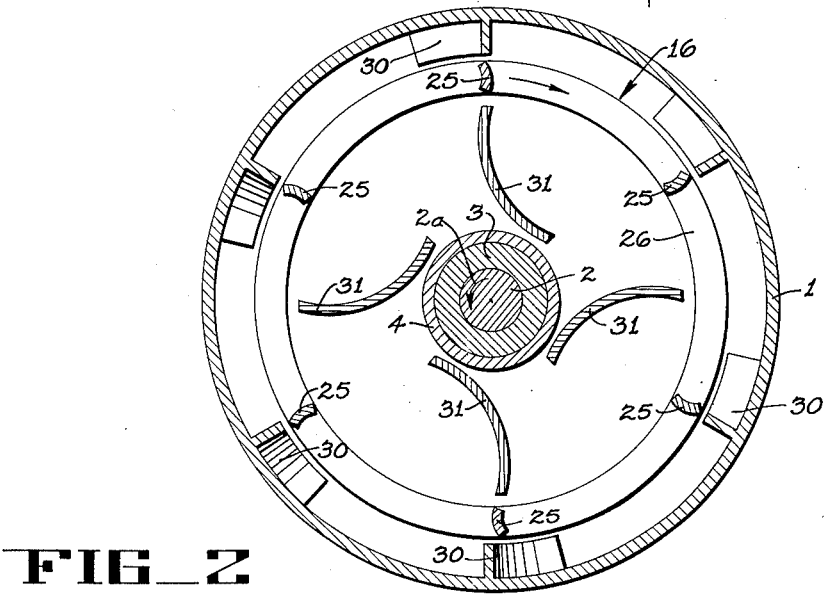
FIG_2
Inventor
Worthin F. Grattan
By Hans G. Hoffmeister
ATTORNEY Nov. 4, 1952 W. F. GRATTAN 2,616,537
FLUID TRANSMISSION
Filed March 14, 1949 2 SHEETS—SHEET 2
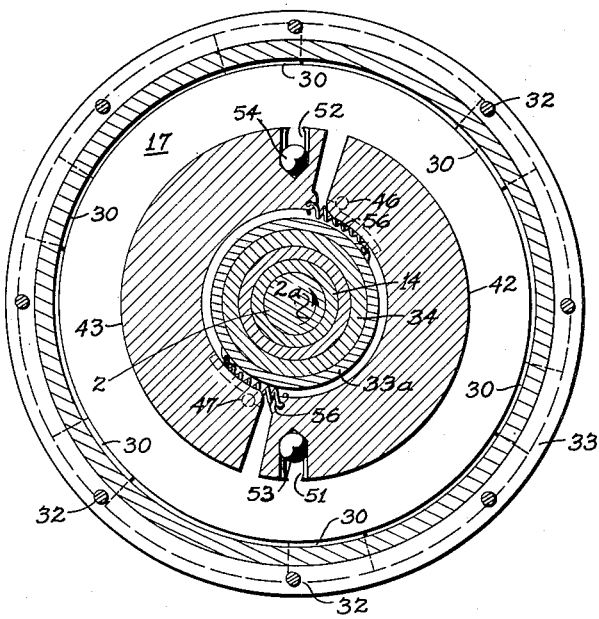
Inventor
Worthin F. Grattan
By Hans G. Hoffmeister
ATTORNEY Patented Nov. 4, 1952

2,616,537

UNITED STATES PATENT OFFICE 2,616,537

FLUID TRANSMISSION

Worthin F. Grattan, Campbell, Calif.

Application March 14, 1949, Serial No. 81,351

7 Claims. (Cl. 192—3.2)

The present invention relates to a fluid transmission for automobiles.

One object of the present invention is to provide a simple and efficient fluid transmission which may be manufactured at low cost.

Another object is to provide an improved fluid transmission provided with a friction clutch for connecting the driving and driven members after the driven member has attained a predetermined speed.

Another object is to provide a fluid transmission which gives a multitude of torque variations from zero to equal revolutions of the drive member.

These and further objects and advantages of the present invention will become apparent from the following description and drawings in which:

Fig. 1 is a longitudinal section of the fluid transmission of the present invention.

Fig. 2 is a transverse section of Fig. 1 taken along line 2—2 thereof.

Fig. 3 is a transverse section taken along line 3—3 of Fig. 1.

Fig. 4 is a transverse section through the friction clutch mechanism taken along line 4—4 of Fig. 1.

Fig. 5 is a transverse section through the overrun clutch, the section being taken along line 5—5 of Fig. 1.

Referring now to Fig. 1 of the drawings the fluid transmission of the present invention comprises a housing 1 within which the drive shaft 2 of the engine of the automobile is rotatably supported by means of a sleeve bearing 3. The bearing 3 is preferably mounted within a hub portion 4 formed in the housing 1 and a packing 6 of any conventional construction is interposed between the drive shaft 2 and the hub portion 4.

Fixed to the drive shaft 2 by means of a set screw 8 (Fig. 3) is an impeller 9 which comprises a plurality of radially arranged straight impeller blades 11 provided with a circular wall 12 closing on side of the impeller structure. Rotatably supported on the free end of the drive shaft 2 by means of a sleeve bearing 14 is a rotor or driven member 16 having a radial wall 17 extending parallel and adjacent to the impeller wall 12. A friction clutch lining 18 is secured to the radial wall 17 and is normally held out of engagement with the impeller wall 12 by means of a coil spring 21 interposed between the bearing 14 and the hub 22 of the impeller 9.

The disc 17 of the driven member 16 is provided with a plurality of curved impeller blades 25, having an annular end wall 26. These impeller blades are divided by an annular partition 27 into blades or blade portions 28 and 29 and are fixed to the radial wall 17. Disposed exterior of and adjacent to the blades 28 and 29 are a plurality of curved blades 30 which are fixed to the inner wall of the housing 1. The configuration of the blades 30 being such that the flow of driving liquid or oil from the impeller 9 to the blades 28 is directed by the blades 30 toward the blades 29 and a plurality of curved blades 31 fixed to the side wall of the housing 1 adjacent the impeller 9 and interior of the blades 29. The driven member 16 is so configurated that the blades 29 thereof extend over the blades 31 and encircle the same in a manner as clearly shown in Figs. 1 and 2.

Secured to the housing 1 by means of cap screws 32 is a cover 33 within the hub portion 33a of which the hub or shaft portion 23 of the driven member 16 is rotatably supported by means of a bearing 34. A packing 36 intermediate the hub portion 33a of the cover 33 and the shaft 23 of the driven member 16 is employed to form a liquid tight seal between the housing 1 and the shaft 23. The same sealing function is carried out by the packing 6 between the housing 1 and the drive shaft 2 on the other side of the housing structure.

Both packing members 6 and 36 are only diagrammatically illustrated in the drawings and it is to be understood that any conventional type packing suitable for the purpose may be employed.

The housing 1 is filled with oil or any other appropriate liquid through an opening 37 in the housing 1 which is normally closed by a threaded plug 38

Disposed between the disc 17 and the cover 33 is a friction clutch 41 which has been clearly shown in Fig. 4. This clutch comprises two heavy arms 42 and 43 pivotally mounted at 46 and 47, respectively, on pivot pins 48 carried by the cover 33. Disposed within cut-out portions 51 and 52 of the arms 42 and 43 are balls 53 and 54. The edges and open ends of the cut-out portions 51 and 52 are peened inwardly to retain the balls within the cut-out portions of the arms 42 and 43 during operation of the device as clearly shown in Fig. 4 of the drawings. The arms 42 and 43 are normally held in closed position as shown in Fig. 4, and in full lines in Fig. 1, by means of coil springs 56 one end of which is secured to the arms and the other end of which is secured to the hub portion 33a of the cover 33.

The arms 42 and 43 form heavy weights which swing outwardly under centrifugal force at a predetermined speed of rotation whereby the balls 53 and 54 are jammed between the disc 17 and cover 33 (as shown in dotted lines in Fig. 1) and force the disc 17 laterally toward the radial wall 12 of the impeller effecting frictional engagement between the clutch lining 18 and wall 12 thereby establishing a firm driving relation between the disc 17, wall 12 and the housing 1.

The cover 33 is provided with an annular extension 61 which embraces a sleeve 62 fixed to the housing of the reverse gear box (not shown) with which automobile transmissions of this type are equipped. The sleeve 62 (Figs. 1 and 5) is provided with a plurality of recesses 63 within which rollers 64 are disposed. The bottom surface of the recesses is inclined as shown in Fig. 5 so that the casing 1 is free to rotate in a clockwise direction but rotation in counter-clockise direction as viewed in Fig. 5 is prevented.

The blades 11 of the impeller are preferably straight radially extending blades, while the blades 28 and 29 of the driven member are slightly curved as shown in Fig. 2. The blades 30 are of such curved configuration as to reverse the flow of oil from the blades 28 to the blades 29 and the curvature of the blades 31 is such as to return the oil from the blades 29 to the impeller blades 11.

The operation of the fluid transmission of the present invention is as follows: The automobile engine drives the shaft 2 in counter-clockwise direction (as indicated by arrow 2a in Fig. 1 and as viewed in Figs. 2 and 4) and clockwise as viewed in Figs. 3 and 5 whereby a corresponding rotation of the impeller 9 in the same direction as indicated by arrow 11a in Fig. 3 is effected. This rotation of the impeller propels the oil and drives the same against the blade portions 28 thereby imparting rotation to the driven member 16 in the direction of arrow 16a, Fig. 3. The oil is deflected by the blades 28 against the curved blades 30 carried by the housing 1 which reverse the flow of oil and direct the same against the blades 29 of the driven member 16. The oil then flows against the curved blades 31 which direct the oil back to the impeller blades 11 in the direction of rotation of the same.

It will therefore be seen that the driving oil of the fluid transmission is propelled in a circular path, as indicated by arrows a in Fig. 1, from the impeller blades 11 against blades 28, 30, 29, 31 and back to the impeller blades 11. The housing 1 is held against rotation in clockwise direction as viewed in Fig. 2, or in counter-clockwise direction as viewed in Fig. 5, by the overrun clutch mechanism 63, 64 above described so that when the oil is driven in this manner the resultant forces drive the driven member 16, i. e., blades 28, 29, disc 17 and shaft 23, in the same direction as the impeller 9 namely in counter-clockwise direction as indicated by arrow 2a in Fig. 1.

When the blades 28 and 29 of the driven member 16 approach the speed of rotation of the impeller blades 11, the housing 1 begins to rotate in counter-clockwise direction, as viewed in Fig. 2 with the impeller and driven member and when the housing 1 attains sufficient speed the weights or arms 42 and 43 are thrown outwardly against the tension of springs 56 about their pivots 46 and 47, respectively, under the action of the centrifugal force so that the balls 51 and 52 are forced between the cover 33 and the disc 17 forcing the latter to the right (Fig. 1) whereby the clutch surface 18 is forced into frictional engagement with the disc 12 of the impeller 9 and the impeller 9, driven member 16 and housing 1 are firmly clutched together by means of the clutch lining 18 and balls 52 and 53 as clearly apparent from Fig. 1.

Consequently, the impeller 9, driven member 16 and housing 1 are now rotating as a single unit in counter-clockwise direction, as indicated by arrow 2a in Fig. 1, and the flow of the oil within the housing 1 ceases. The mechanism functions now as a mechanical coupling until the speed of rotation of the unit, i. e., the housing 1, is reduced whereupon the springs 56 force the arms 42 and 43 back to their original position (Fig. 4) against to reduce centrifugal force. The mechanical coupling ceases and a fluid transmission is again established. The impeller 9 again propels the oil against the blades 28, 30, 29 and 31 and counter-clockwise rotation (in the direction of arrow 2a Fig. 1) of the housing 1 ceases while the clockwise rotation thereof is prevented by the overrun clutch 63, 64 heretofore described.

In this manner the fluid transmission of the present invention permits the transmission of power at increasing speeds and provides the advantage that when a predetermined speed is attained a mechanical coupling between the drive and driven members is obtained.

I desire it to be understood that the invention is not limited to the particular application or precise details of construction illustrated, but that various applications, modifications, and variations may be resorted to without departing from the spirit or scope of the invention, and I deem myself entitled to all such applications, modifications, and variations as come within the scope of the claims appended hereto.

Having thus described my invention what I claim as new and desire to protect by Letters Patent is:

1. A fluid transmission comprising a driving and a driven member, a housing rotatable with respect to said driving and driven member, containing a driving fluid and provided with means interposed between said driving and driven member for establishing driving relation therebetween through said fluid, and means interposed between said driving and driven member and said housing and connected to said housing to be set into actuation by rotation thereof for mechanically coupling said members and housing for rotation as a unit.

2. A fluid transmission comprising a driving member, a driven member adjacent said driving member, a housing enclosing said members and containing a driving fluid, fluid directing blades on said housing adjacent said members for redirecting the flow of fluid to thereby impart rotation to said housing, and means coacting with said housing and members responsive to centrifugal force at a predetermined speed of rotation of said housing for mechanically coupling said driving member, driven member and housing for rotation at the same speed.

3. A fluid transmission comprising a rotatable housing containing a driving fluid, a driving member having fluid impeller blades rotatably mounted in said housing, a driven member having blades rotatably mounted in said housing and freely rotatable relative to said impeller blades, fluid directing blades on said housing for redirecting the flow of fluid to thereby impart rotation to said housing, and means connected with the housing to be actuated by rotation thereof for mechanically coupling said housing, driving member, and driven member for rotation as a unit at a predetermined speed.

4. A fluid transmission comprising a driving member provided with fluid impelling blades, a driven member provided with fluid driven blades, a rotatable housing containing a driving fluid and enclosing said members, said housing being provided with fluid directing blades for maintaining a flow of fluid between the blades of said driving and driven members during rotation of the same at differential speeds, and means co-acting with the housing, driven and driving members and connected to said housing for actuation by rotation of said housing for mechanically coupling said housing, driven and driving members at a predetermined speed.

5. A fluid transmission comprising a driving member provided with fluid impelling blades, a driven member provided with fluid driven blades, a rotatable housing containing a driving fluid and enclosing said members, said housing being provided with fluid directing blades for maintaining a flow of fluid between the blades of said driving and driven members during rotation of the same at differential speeds, and means connected to said housing for actuation thereof by rotation of said housing for mechanically coupling said housing, driving and driven members when the driven member approaches the speed of the driving member.

6. A fluid transmission comprising a driving member provided with radially extending straight fluid impelling blades, a driven member adjacent said driving member and provided with laterally extending curved fluid driven blades annularly arranged around said impelling blades, a rotatable housing enclosing said members and containing a driving fluid, a plurality of curved fluid directing blades on said housing exterior of and annularly disposed around said fluid driven blades, a plurality of fluid directing blades disposed interior to said fluid driven blades and adjacent said impelling blades, means for preventing rotation of the housing in one direction, and means for mechanically coupling said housing, driving and driven members for rotation as a unit when said housing rotates in the direction of said driving and driven members at a predetermined speed while said driven member approaches the speed of said driving member.

7. A fluid transmission comprising a driving member provided with fluid impelling blades, a driven member adjacent said driving member and provided with fluid driven blades arranged around said impelling blades, a rotatable housing enclosing said members and containing a driving fluid, a plurality of fluid directing blades on said housing exterior of said fluid driven blades, a plurality of fluid directing blades disposed interior of said fluid driven blades and adjacent said impelling blades, means for preventing rotation of the housing in one direction, and means responsive to centrifugal force at a predetermined speed of rotation for mechanically coupling said housing, driving and driven members for rotation as a unit when said housing rotates in the direction of said driving and driven members at a predetermined speed.

WORTHIN F. GRATTAN.

REFERENCES CITED

The following references are of record in the file of this patent:

UNITED STATES PATENTS

| Number | Name | Date |
|---|---|---|
| 1,934,936 | Lysholm | Nov. 14, 1933 |
| 1,960,705 | Kochling | May 29, 1934 |
| 2,034,757 | Herreshoff | Mar. 29, 1936 |
| 2,055,300 | Maurer | Sept. 22, 1936 |
| 2,186,025 | Jandasek | Jan. 9, 1940 |
| 2,313,645 | Jandasek | Mar. 9, 1943 |
| 2,440,155 | Peterson et al. | Apr. 20, 1948 |